US008826658B2

(12) United States Patent
Foster et al.

(10) Patent No.: US 8,826,658 B2
(45) Date of Patent: Sep. 9, 2014

(54) WAVE POWERED GENERATOR

(75) Inventors: Graham Foster, Swansea (GB); Gareth Stockman, Swansea (GB)

(73) Assignee: Marine Power Systems Limited, Swansea (GB)

(*) Notice: Subject to any disclaimer, the term of this patent is extended or adjusted under 35 U.S.C. 154(b) by 873 days.

(21) Appl. No.: 13/054,160

(22) PCT Filed: Jul. 14, 2009

(86) PCT No.: PCT/GB2009/050847
§ 371 (c)(1),
(2), (4) Date: Jan. 14, 2011

(87) PCT Pub. No.: WO2010/007418
PCT Pub. Date: Jan. 21, 2010

(65) Prior Publication Data
US 2011/0113771 A1 May 19, 2011

(30) Foreign Application Priority Data

Jul. 14, 2008 (GB) .................................. 0812754.0
Jan. 19, 2009 (GB) .................................. 0900729.5
Jul. 8, 2009 (GB) .................................. 0911835.7

(51) Int. Cl.
*F03B 13/18* (2006.01)
*F03B 13/20* (2006.01)

(52) U.S. Cl.
CPC .............. *F03B 13/189* (2013.01); *Y02E 10/38* (2013.01); *F05B 2240/917* (2013.01); *F03B 13/20* (2013.01)

USPC ................................. 60/504; 60/497; 60/501

(58) Field of Classification Search
USPC .......... 60/495–507; 290/42, 53; 417/330, 331
See application file for complete search history.

(56) References Cited

U.S. PATENT DOCUMENTS

| 6,392,314 B1 * | 5/2002 | Dick .............................. 290/53 |
| 7,245,041 B1 * | 7/2007 | Olson ............................ 290/53 |
| 2003/0155774 A1 * | 8/2003 | Chalmers et al. ............. 290/53 |
| 2007/0193265 A1 | 8/2007 | Skotte et al. |

FOREIGN PATENT DOCUMENTS

| AU | 55812 | 11/1974 |
| WO | 9820254 | 5/1998 |
| WO | 9928623 | 6/1999 |
| WO | 2006085123 A1 | 8/2006 |
| WO | 2009124344 A1 | 10/2009 |

* cited by examiner

*Primary Examiner* — Christopher Jetton
(74) *Attorney, Agent, or Firm* — Larson & Anderson, LLC (57) ABSTRACT

The generator comprises a float (1) which is movable in response to wave motion in a body of water, a submersible reaction member (2) of adjustable buoyancy, with at least two buoyancy configurations, connected to the float and arranged to resist movement of the float caused by the wave motion, an energy converter (5) for converting such reciprocal movement to useful energy; and biasing means such as a spring 6 for directionally biasing the reciprocal movement. Displacement of the float relative to the reaction member is permitted and reciprocal movement generated in response to such displacement.

24 Claims, 9 Drawing Sheets

WAVE POWERED GENERATOR

This application is the national stage of PCT/GB2009/050847 filed Jul. 14, 2009, which claims priority to GB0812754.0 filed on Jul. 14, 2008, GB0900729.5 filed on Jan. 19, 2009, and GB0911835.7 filed on Jul. 8, 2009, all of which are incorporated by reference.

The present invention relates to generators that can be used to extract energy from waves in a body of water by converting such energy to useful energy.

In recent years, there has been increased emphasis on the need to exploit renewable energy so that it significantly contributes to global energy production. A combination of government targets, media representation of the issues associated with non-renewable energy sources, and ever increasing energy costs have created a powerful driving force for the development of renewable energy systems.

Negative impacts of fossil fuels on our environment are well known, as are the problems and high costs associated with nuclear energy. Harnessing of the huge natural abundance of renewable energy on the other hand is constrained merely by our capability of capturing and supplying it at an economically viable price.

One potential renewable energy source is wave power—an abundant and consistent energy resource available in all of the world's large oceans and seas. Various wave power generating devices have emerged as a potential method of capturing this energy, however, current devices have many limitations with no one device having the proven ability to reliably exploit the available resource long term.

Existing designs for generating electricity from wave power can be divided into six main categories: floating attenuators, surge converters, oscillating water column devices, overtopping devices, submerged pressure differential devices and point absorbers. Most of these can be either floating or based on the sea bed. There are also other types of device which are not easy to categorise, examples being soft flexible structures or rotors that are turned directly by the waves. Each of these different approaches has their own inherent advantages and disadvantages.

Attenuators are devices with floating bodies connected by hinged joints. As waves pass under the device, these bodies independently align with either peaks or troughs causing the device to flex about the hinged joints. The hinged joints can be constrained by energy converters to turn the flexing of the joints into useful energy.

Attenuators have the advantages of being easy to conceive and construct, whilst also reasonably easily transportable across the sea surface as the entire structure is designed to be floating. They are also generally easy to install and maintain as the working parts of the devices are easily accessible.

However, there are inherent disadvantages with attenuators. Because ocean waves typically have wavelengths in the region of several tens of metres, attenuators must be extremely long to facilitate the different bodies aligning with alternate peaks and troughs. Similarly, an attenuator can only work at optimum efficiency at a single set wavelength as a result of the spacing of the bodies. As the wavelength moves from this optimum value the efficiency drops. Attenuators also have to be aligned to the direction of the waves and if the swell direction varies significantly from the axis of the device then efficiency will again drop considerably. Survivability is also a concern with these devices as the entire machine is on the surface and exposed to storms, with the joints between bodies being a particular weakness. An example of a device including an attenuator is disclosed in WO0017519.

Point absorbers are quite varied in their construction but generally comprise a floating displacer that is moved by the waves and a reactor that is relatively stationary. The relative movement between the displacer and the reactor is then constrained by an energy converter to generate power. Point absorbers have the generic advantages of being flexible to position and they can absorb wave energy from all directions. The disadvantages tend to be associated with the specific types.

Some point absorbers are completely floating devices that have a built in reactor allowing them to be self reacting. This has the advantage of making the device reasonably easy to transport and install. Self reactors often take the form of sea anchors with a large surface area against which a surface displacer can heave. Another method of self reacting is a suspended weight that resonates in response to the periodic movement of the displacer caused by the waves.

The disadvantage of existing self reacting devices is that the energy converter is generally positioned on the surface with the rest of the device and is therefore exposed to damage from storms. Resonating point absorbers have the added disadvantage of having only a single optimum resonating frequency or else they incorporate variable tuning mechanisms at extra complexity and cost.

Some point absorber devices have the reactor positioned on the sea bed. This has the advantage of providing a virtually immovable reaction platform and any parts of the device positioned on the sea bed are protected from damage from storms at the surface. The downside to this approach is that seabed based devices are difficult and therefore costly to install and maintain. An example of a resonating, self reacting point absorber device is disclosed in WO0196738.

Surge converters exploit the to and fro motion of the waves to generate energy. Typically they comprise of a large paddle on a pivoting joint that is pushed and pulled by the surge and constrained by an energy converter. The advantages of surge converters are that they are easy to conceive and construct.

Surge converters do have several disadvantages however. They are generally only effective in shallow water as the circular motion of open ocean waves is only converted to surge once the depth of water reduces significantly. They also require a base to be securely fixed to the seabed so the entire device does not become swept along with the surge. Additionally, they are potentially exposed to breaking waves and as a result, survivability is a serious concern. An example of a surge converter device is disclosed in WO2006100436.

Oscillating water column devices utilize a partially submerged, hollow structure that encloses a column of air on top of a column of water. The column is open to the sea below the water line allowing the influence of waves to enter the structure and cause the water column to rise and fall, which in turn causes the air column to follow. The air column is allowed to flow to and from the atmosphere via a turbine which generates power. The turbine is usually a bi-directional Wells turbine so that it can continue rotating the same way on both the rise and fall of the waves. Most oscillating water column devices are built into sea walls or cliffs but they can also be built into offshore floating structures.

Oscillating water column devices have the advantage that the only serviceable component, the turbine, is out of the water and therefore easy to access and maintain. They also lend themselves well to being built into breakwater type structures in a cost effective manner.

There are, however, some significant drawbacks to oscillating water column devices. The use of air to operate the turbine means that significant efficiency is sacrificed by using a low density compressible medium to operate the turbine.

Shore based structures are only exposed to relatively low wave energies as large waves will break and expend themselves before they reach the shore. Offshore devices have to be extremely large in order for the device to remain stationary relative to the waves, and they also have to have a considerable bulk above the surface making them susceptible to damage from storms and a danger to shipping. An example of an oscillating water column device is disclosed in GB 2250321.

Overtopping devices work by creating a reservoir of water above sea level that is filled by waves physically flowing up a ramp into it. This reservoir is then allowed to drain through a channel that contains a turbine. Collectors are often used to focus waves into the reservoir, improving energy capture. Overtopping devices can be built into the sea shore or be floating devices positioned offshore.

Overtopping devices have the advantage that the power output is smoothed by the reservoir eliminating the spikes which have to be managed with other devices.

The difficulties with overtopping devices are similar to those for oscillating water column devices. Shore based devices are not exposed to high wave energy, whilst offshore devices have to be very large to be effective and therefore are vulnerable to storms and pose a threat to shipping. Offshore devices also have the problem of matching the ramp height to the wave height: if the ramp is too big then the device is unable to capture any energy under small wave conditions, if the ramp is too small then large waves will wash back out of the device and the energy will be lost. An example of a floating overtopping device is disclosed in WO9600848.

Submerged pressure differential devices work by exploiting the change in underwater hydrostatic pressure caused by waves passing overhead. These devices usually comprise of a compressible chamber that moves in response to the pressure differential it experiences as waves pass above, with the movement being constrained by an energy converter to generate power. They are also normally constructed on the sea bed in fairly shallow water as this causes the waves to rise up and create a significant percentage change in pressure.

The advantages of submerged pressure differential devices are that they are protected from storm damage by being positioned on the sea bed, and can generate power with waves from any direction.

Submerged pressure differential devices do have some notable disadvantages however. In order for the pressure differential caused by the waves to be a significant proportion of the total pressure, which in turn allows significant compression and expansion of a compressible chamber, the depth of the water in which it is positioned has to be reasonably shallow, yet if it is too shallow the device will become exposed to breaking waves. Therefore the depth range suitable for pressure differential devices is extremely limited. Submerged pressure differential devices also need to be positioned and anchored to the sea floor which greatly increases the cost of installation and servicing. An example of a submerged pressure differential device is disclosed in WO2008149084.

It is clear that known wave power devices still have significant drawbacks which, at best, will manifest themselves as increased cost of the power produced. At worst, some devices will inevitably prove completely unsuitable for the marine environment and will never be practical long term.

Of the known devices, floating point absorbers seem to offer the least problematic solution to the extraction of power from ocean waves. The advantages of being flexible to position, simple to install, serviceable, reasonably transportable, and reasonably survivable make them most likely to be able to meet the challenge of reliably extracting power from the sea.

However, the currently available floating point absorber devices are still far from an optimum solution. They have a significant structure on the sea surface which is susceptible to damage from storms, pose a threat to shipping and can create a visual eyesore. Their transportability is an improvement over many types of device but it could still be improved greatly.

An improved point absorber device that mitigates the above disadvantages would provide a superior solution to the problems involved with extracting useful energy from sea or ocean waves.

Such an improved device should meet the following criteria:

It should be of a simple construction and be cost effective to manufacture;

It should be very easily transportable so that single or multiple units can be transported easily and cost effectively long distances;

It should be very easy to install with a simple sea surface based procedure to connect to mooring lines and a power umbilical;

It should be simple to service and maintain on-site, and also be easily removable from site to carry out a major servicing;

It should be easy to decommission so that there are no unexpected costs at the end of the device's working lifetime;

It should survive the marine environment and the extreme storms it may be subject to, preferably by not having any significant structure on or close to the sea surface;

It should not pose a threat to shipping or create a significant visual impact by having large or hard structures on the sea surface;

It should have a simple and efficient energy capture mechanism;

It should be able to absorb wave energy from any direction;

It should be positionable in various depths of water including very deep water; and It should not pose any threat to marine life in operation and its installation or removal should involve minimal disturbance to the sea bed.

Attempts to solve some of the above the problems have been previously disclosed.

For example, U.S. Pat. No. 7,245,041 discloses a device in which a series of wave operated floats suspend a common crankshaft with a spring biasing each float. The mass of the common crankshaft and surrounding casing resists the movement of the floats but there is no method by which its inertia can be further increased, or a means by which the device can attain a convenient transportation configuration.

AU5581273 discloses a point absorber device which has a subsea reaction member that can be filled with water to increase its inertia. However, the reaction member is not biased toward the float and there is no way for the device to achieve a convenient transportation configuration.

JP55125364 discloses a point absorber device with a flat plate reaction member movably coupled to a surface float and constrained by a linear generator. However, the inertia of the reaction member cannot be increased and the device has no convenient transportation configuration.

U.S. Pat. No. 6,229,225 discloses a subsea surging device in which an energy converter is biased by a spring. However, the device is constrained by anchoring to the sea bed and therefore very difficult to install and maintain.

EP0265594 and WO2008130295 disclose point absorber devices in which an energy converter is biased by a spring. Such devices are constrained by anchoring to the sea bed and are therefore very difficult to install and maintain.

According to the invention therefore there is provided a wave generator that addresses the above criteria, which comprises:
buoyancy means which is movable in response to the wave motion,
a subsurface reaction member of adjustable buoyancy with at least two buoyancy configurations, the subsurface reaction member being connected to the buoyancy means and having inertia and/or drag to resist movement of the buoyancy means caused by the wave motion,
means for permitting relative movement between the subsea reaction member and the buoyancy means
energy conversion means for converting the relative movement to useful energy; and
biasing means (such as a spring) for directionally biasing the subsea reaction member relative to the buoyancy means The wave generator according to the invention is advantageously a point absorbing device that comprises a submersible subsea reaction body that is suspended from a buoyant body by a connecting line. An energy converter and biasing means (such as an elastic return means) generally operate between the connecting line and the reaction body; they are generally mounted on the reaction body.

The submersible reaction body is suspended at a depth sufficient to ensure that it is below the influence of waves on the sea surface. Therefore the up and down heaving movement of the displacing float caused by the waves results in relative reciprocating motion between the two bodies which can be exploited by the energy converter.

In order to take advantage of reciprocating force generated by the buoyant body or surface float, the energy converter provides a working stroke through which it can operate. When the sea surface is flat, the spring and energy converter will rest at a neutral mid-stroke position where the weight of the reaction body is equal to the spring force. The stroke afforded each side of the neutral position defines the working stroke of the system.

When waves impart movement onto the buoyant body or surface float, the movement is transferred to the spring and energy converter by the connecting line. The spring maintains tension in the connecting line and allows the energy converter to work on the downward stroke by storing energy on the upward stroke.

The submersible reaction member fulfils its function of providing a platform against which the float can heave by being fillable with a large volume of sea water giving it a corresponding large mass and therefore inertia. In addition it has a large surface area perpendicular to the direction of the heave force, which thereby provides further resistance to movement by way of a large drag.

The submersible reaction body is generally of a hollow construction and is able to be selectively filled with air or water to adjust its buoyancy. Therefore the device can have a submersed operating configuration in which the reaction body is full of water, and a buoyant surface configuration in which the body is full of air.

The submersed operating configuration is, as described above, with the reaction body underwater suspended from the surface float.

In the buoyant surface configuration, the reaction body floats on the sea surface with sufficient buoyancy for it to carry all other components of the device, and is readily able to be transported across the sea surface. The device can sit sufficiently high in the water that all connections to mooring lines and power lines can be clear of the water and be easily accessible. The device can also create its own stable service platform with all serviceable components clear of the water to enable easy access for maintenance.

Air can be pumped into the submersible reaction body via a snorkel line attached to the surface float. The snorkel line can either be separate from, or integral with, the main connecting line. Air can be let out of the reaction body via a valve that can be remotely operated from the surface if required.

The submersible reaction body can also have a streamlined hull-like shape to further improve the ease by which it can be towed across the sea surface.

The surface float can, if desired, be made from a soft inflatable material so that in the event of an accidental collision with a surface vessel, no significant damage will be done to either the vessel or the float. A flexible structure to the float would also make it more resilient to forces experienced from surface waves.

Preferred embodiments of the invention will now be described in more detail, with reference to the accompanying drawings, in which.

Like parts are denoted by like reference numerals throughout the drawings.

Referring to FIGS. 1 to 4 there is shown an exemplary wave energy conversion device according to the invention. The device comprises of a displacing body in the form of a surface float 1 that is moved by the waves; a reaction body 2 that is positioned below sea level away from the influence of surface waves 4; and a connecting line 3 that suspends the reaction body 2 from the surface float 1 at a depth set by the length of the connecting line 3.

The device further comprises an energy converter 5, and a spring 6, arranged to operate between the connecting line and the reaction body 2. The energy converter 5 and the spring 6 may be attached to, or mounted on, the reaction body 2.

Movement of the surface float 1 caused by sea waves 4 results in relative motion between the surface float 1 and the reaction body 2. This movement is taken up by the working stroke of the energy converter 5 and the spring 6 and exploited to produce power.

The reaction body 2 is of a hollow construction so that it contains an interior volume 7 that can be selectively filled with water or air to enable the buoyancy of the reaction body 2 to be adjusted. Therefore the device can have an operating configuration in which the reaction body 2 is full of water, and a surface configuration in which the reaction body 2 is full of air.

A snorkel line 8 and valves 9 together allow air to be pumped into, or released from, the interior volume 7. All or part of the snorkel line may be integrated with the main connecting line 3 to avoid tangling.

A power umbilical 10 is connected to the device to allow the useful power generated to be removed to a location where it can be used. For example, this umbilical may be an electrical cable connected to an electricity grid, or a water pipe for delivering high pressure water to a desalination plant.

Mooring lines 11 position the device relative to the sea bed (not shown) and are generally slack, allowing for larger ocean movements such as the tides, and also providing give in the case of extreme wave conditions. The depth of the reaction body 2 is set by the length of the connecting line 3 and not by the mooring lines 11.

Figure 1:
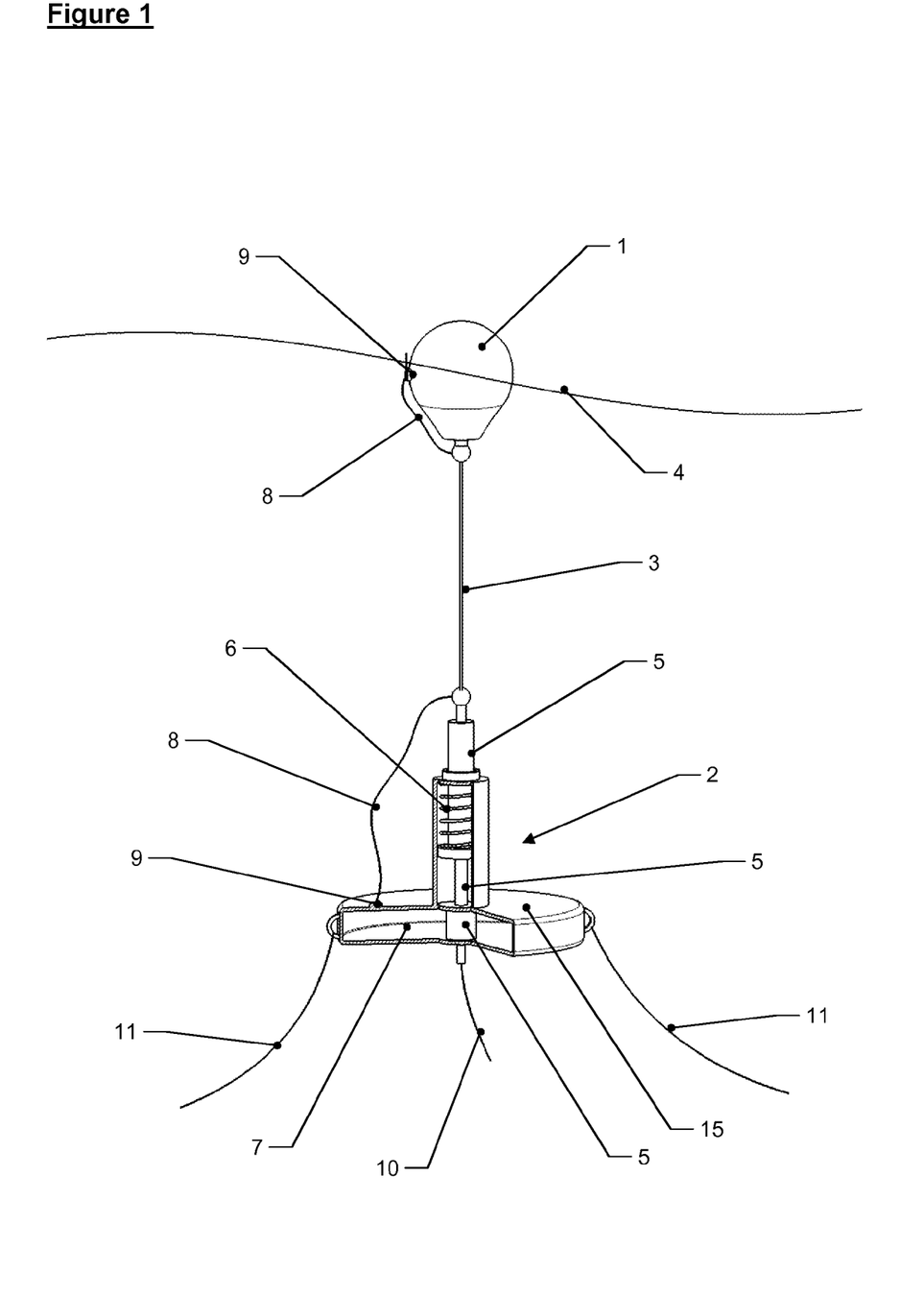
FIG. 1 is a perspective partial cutaway view of a first preferred embodiment of a wave generator according to the invention.
Figure 2:
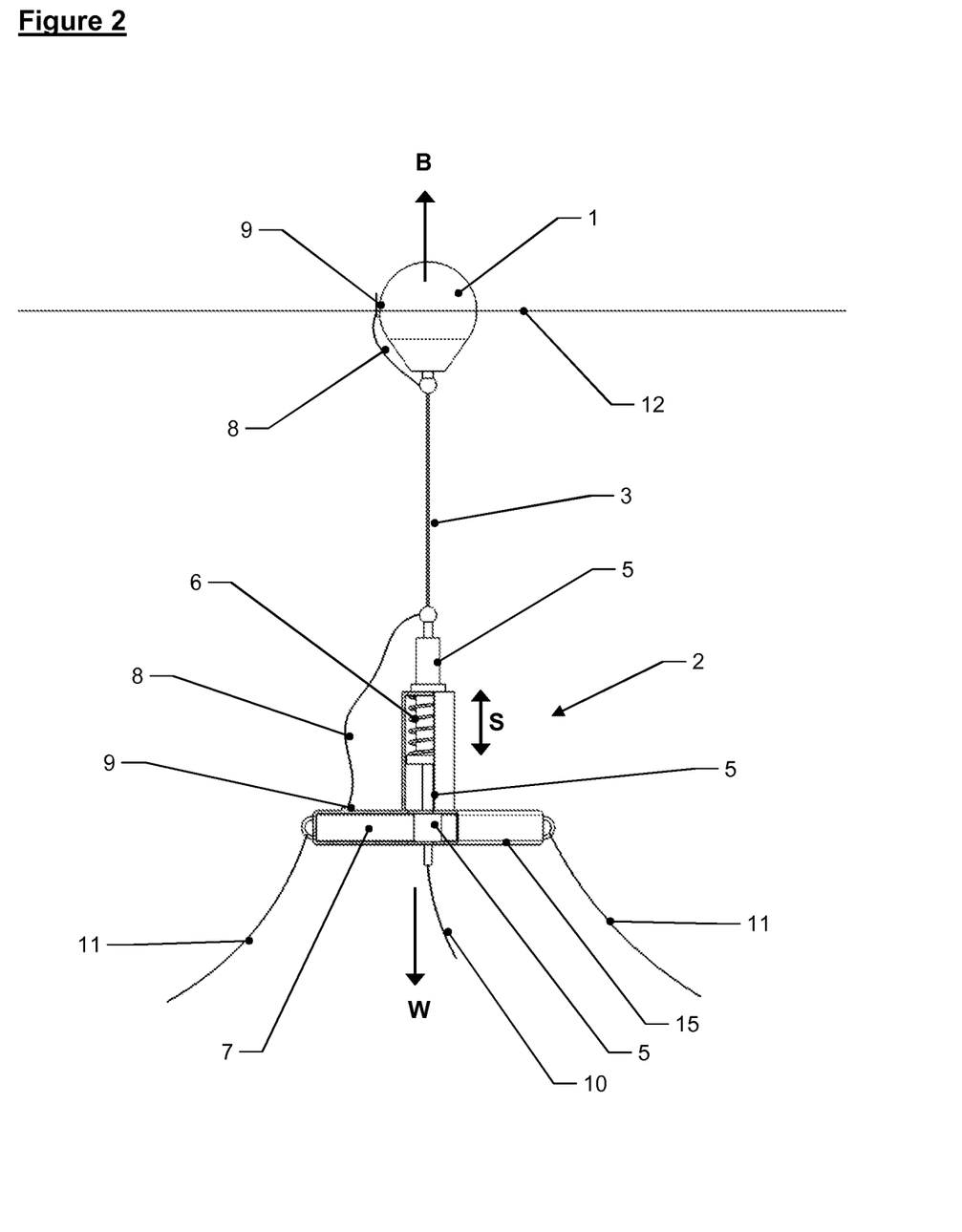
FIG. 2 is a partial cutaway view of the wave generator of FIG. 1 in a in a neutral position.
Figure 3:
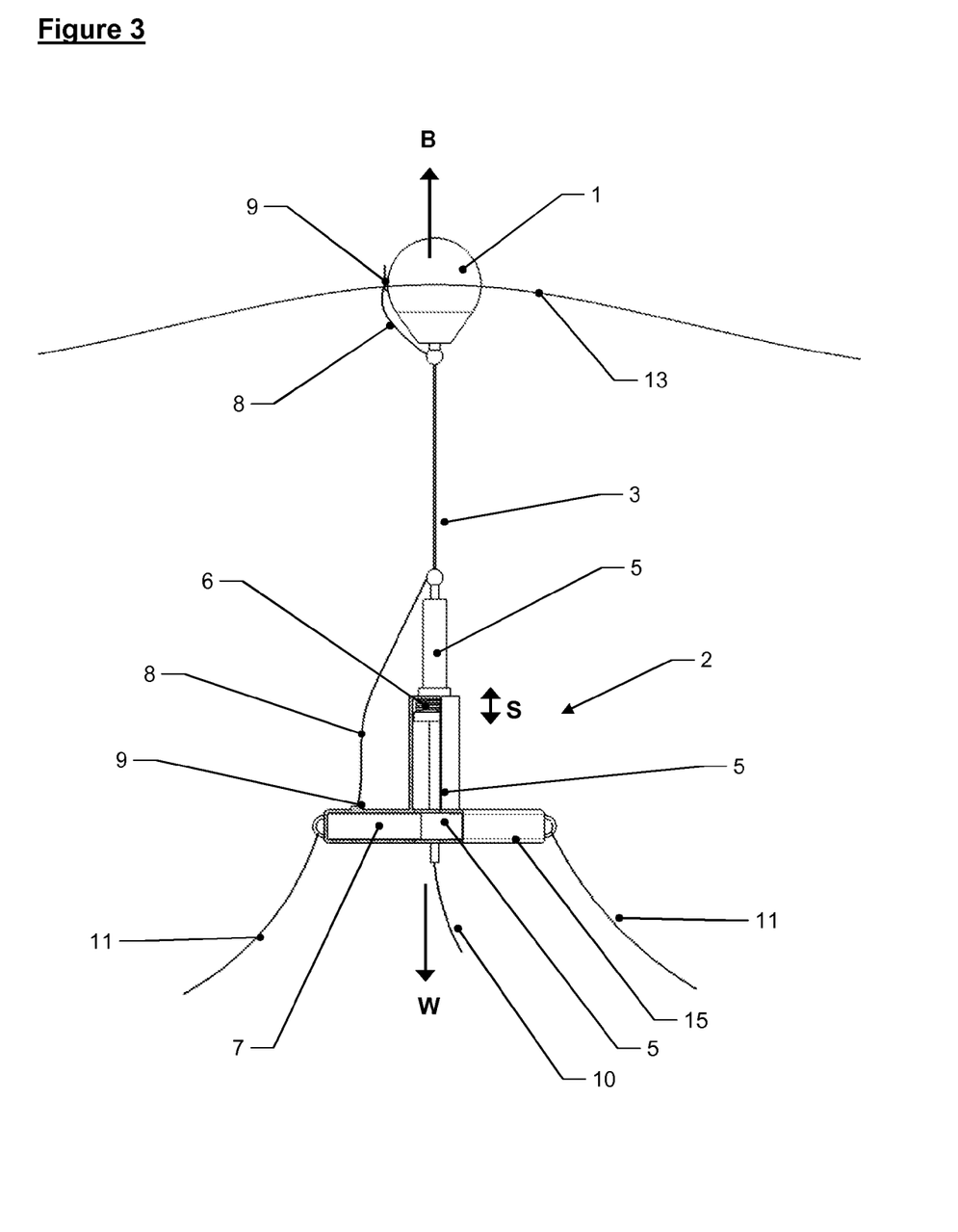
FIG. 3 is a partial cutaway view of the wave generator of FIG. 1 when experiencing a wave peak.
Figure 4:
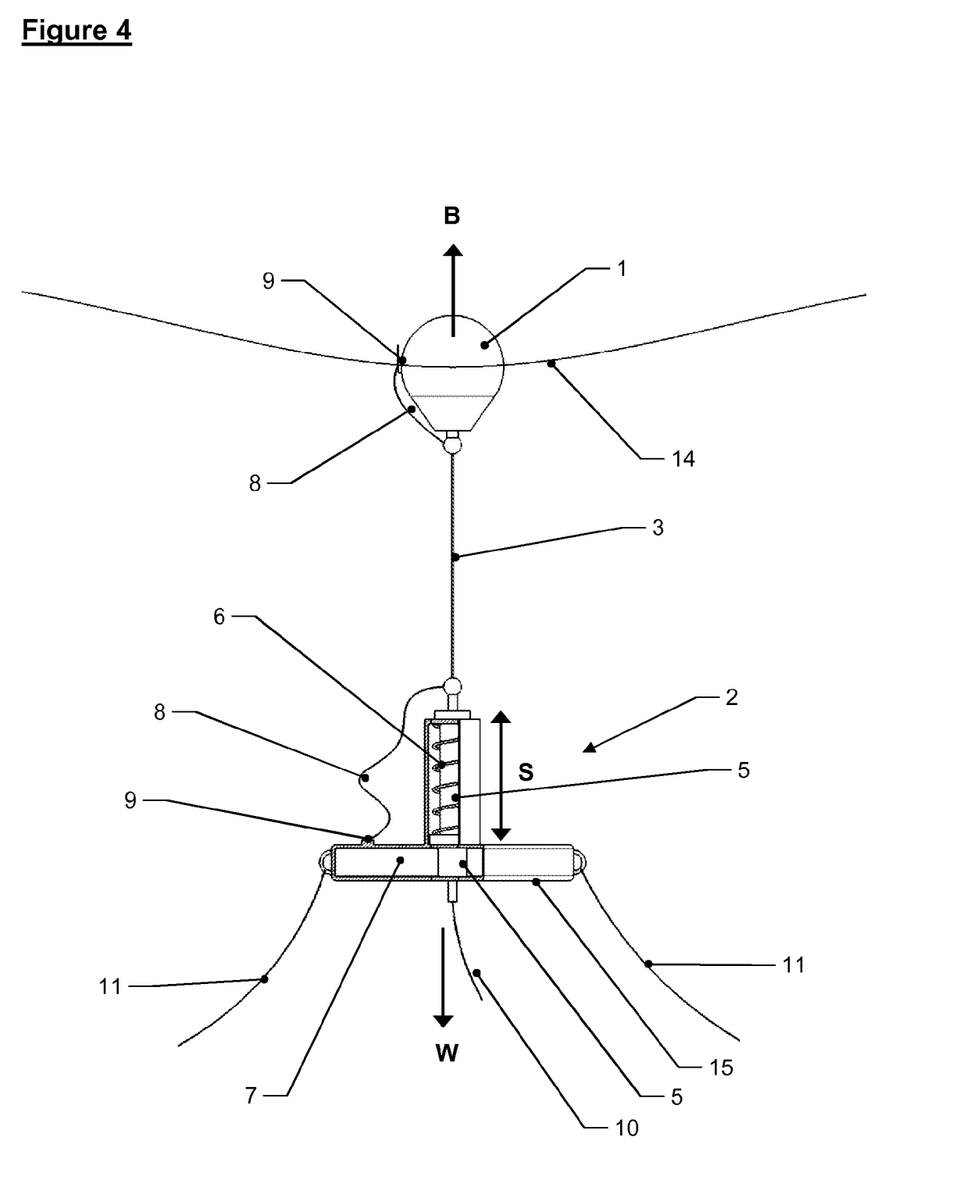
FIG. 4 is a partial cutaway view of the wave generator of FIG. 1 when experiencing a wave trough.

With specific reference to FIGS. 2 to 4, the working of the device in its operating configuration will be described in more detail.

In a neutral position (FIG. 2) with a flat sea surface 12 the weight W of the reaction body 2 is counteracted by an equal and opposing buoyancy B from the surface float 1, which is in turn equal to the spring force S. As the spring 6 is positioned in series between the surface float 1 and the reaction body 2, all forces between the float 1 and the reaction body 2 are transferred via the spring 6. Effectively the reaction body 2 hangs off the spring 6 which in turn hangs off the float 1 (via the connecting line 3).

The energy converter 5 and spring 6 are in the middle of their total working stroke when the device is in its neutral position. This is achieved by making the weight W of the reaction body 2 equal to the spring force S when the spring is in the neutral position.

When the device experiences wave conditions the float 1 is moved up and down by the changing height of the sea surface. This in turn moves the spring 6 and the energy converter 5 relative to the reaction body 2. This relative movement can be exploited by the energy converter 5 to generate useful energy. FIG. 3 shows the configuration of the device when it experiences a wave peak 13 and FIG. 4 a reciprocal wave trough 14.

However, for relative motion to take place between the energy converter 5 and the reaction body 2, the force required to overcome the spring 6 and the energy converter 5 must be significantly less than that required to move the entire reaction body 2. If this was not the case and the forces were similar, the result would be that the entire reaction body 2 would move up and down with the float 1 and the relative movement of the spring 6 and the energy converter 5 would be greatly reduced, with a corresponding drop in the output power of the device.

In order to solve the above problem a way is needed to increase the resistance to movement of the reaction body 2 without changing its weight W. This is achieved in the preferred embodiment by increasing the effective mass, and therefore inertia, of the reaction body 2 in two ways. Firstly, the internal volume 7 of the reaction body 2 is filled with sea water which allows its effective mass to be greatly increased without increasing its weight W. Secondly the reaction body 2 is shaped to have a large surface area 15 perpendicular to the direction of motion of the surface buoy (i.e. parallel to the sea surface) which has the effect of giving the reaction body 2 a very large drag and therefore a high resistance to movement.

The spring 6 is shown in the preferred embodiment as a coil spring purely for illustrative purposes only, and may take the form of any suitable spring return or directional biasing system. Examples of other types of spring or directional bias means include: air springs, elastomeric bands, hydraulic springs and solenoids. The spring return 6 may also be an actively controlled system that is constantly changed in accordance with the ongoing wave conditions in order to maximise the power output of the device.

The energy converter 5 in the preferred embodiment is also represented purely schematically and is not intended to illustrate a particular system. Examples of suitable energy converters include: linear electric generators, hydraulic actuators, fluid pumps and rack and pinion systems which could then be connected to rotary generators. As with the spring 6 the energy converter 5 may be actively controlled to maximise output.

In some cases, in for example hydraulic systems, the spring 6 and the energy converter 5 can be combined into a single system thereby reducing complexity and cost.

When the device is in its surface configuration the reaction body 2 sits sufficiently high in the water for all connections to mooring lines 11 and power lines 10 to be clear of the water and be easily accessible. The device also creates its own stable service platform with all serviceable components above the water to enable easy access for maintenance. Furthermore its shape allows it to be easily towed across the sea surface with only relatively small boats required.

Figure 5:
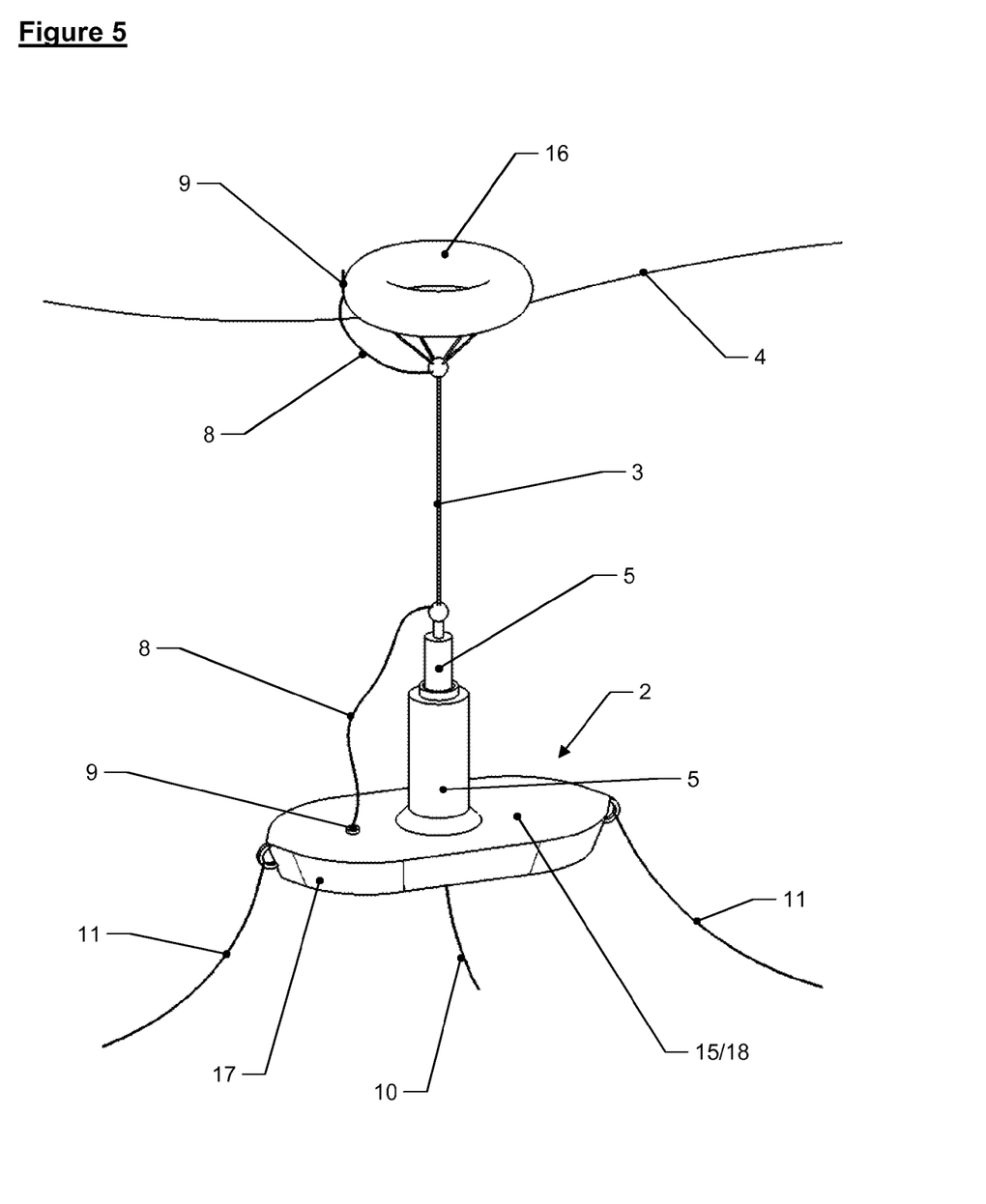
FIG. 5 is a perspective view of a second embodiment of the invention when in a first configuration.
Figure 6:
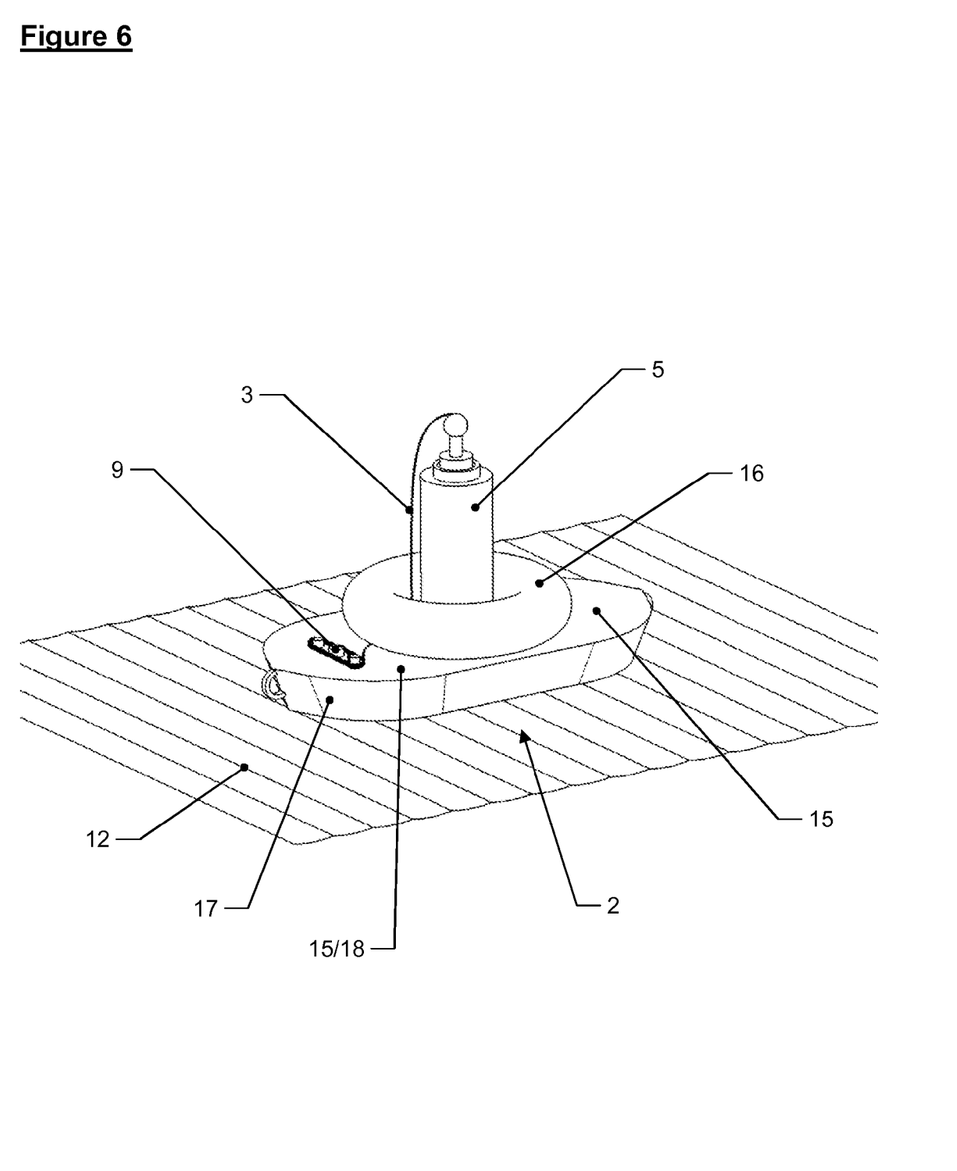
FIG. 6 is a further view of the embodiment of FIG. 5, when in a second configuration.

With reference to FIGS. 5 and 6, a second embodiment of the invention is shown. The second embodiment uses a toroidal surface float 16 that increases the area of wave front that can be captured by the device for the same float volume. The reaction body 2 of the second embodiment also includes a boat shaped hull 17 having an upper deck 18 and streamlined sides; such a shape further improves the transportability of the device over the sea surface 4.

With reference to FIG. 6, the device is shown specifically in its surface configuration. The flotation of the reaction body 2 is sufficient to keep itself and all other components of the device clear of the water. The reaction body 2 is therefore able to perform the function of transport raft and service platform for the entire device.

FIG. 6 also shows one possible transport configuration of the device: the toroidal surface float 16 can be stowed on the deck 18 of the reaction body 2 with the energy converter 5 and spring 6 protruding through the hole in the centre of the float 16, securing it safely in position. The connecting line 3 and/or snorkel line 8 can be coiled on the deck 18 of the reaction body 2 in a convenient manner.

When the device is installed, the float 16 automatically deploys as air is let out of the reaction body 2 and the device attains its operating configuration (ref FIG. 6).

Other aspects of the second embodiment operate in a similar manner to those of the first embodiment.

Figure 7:
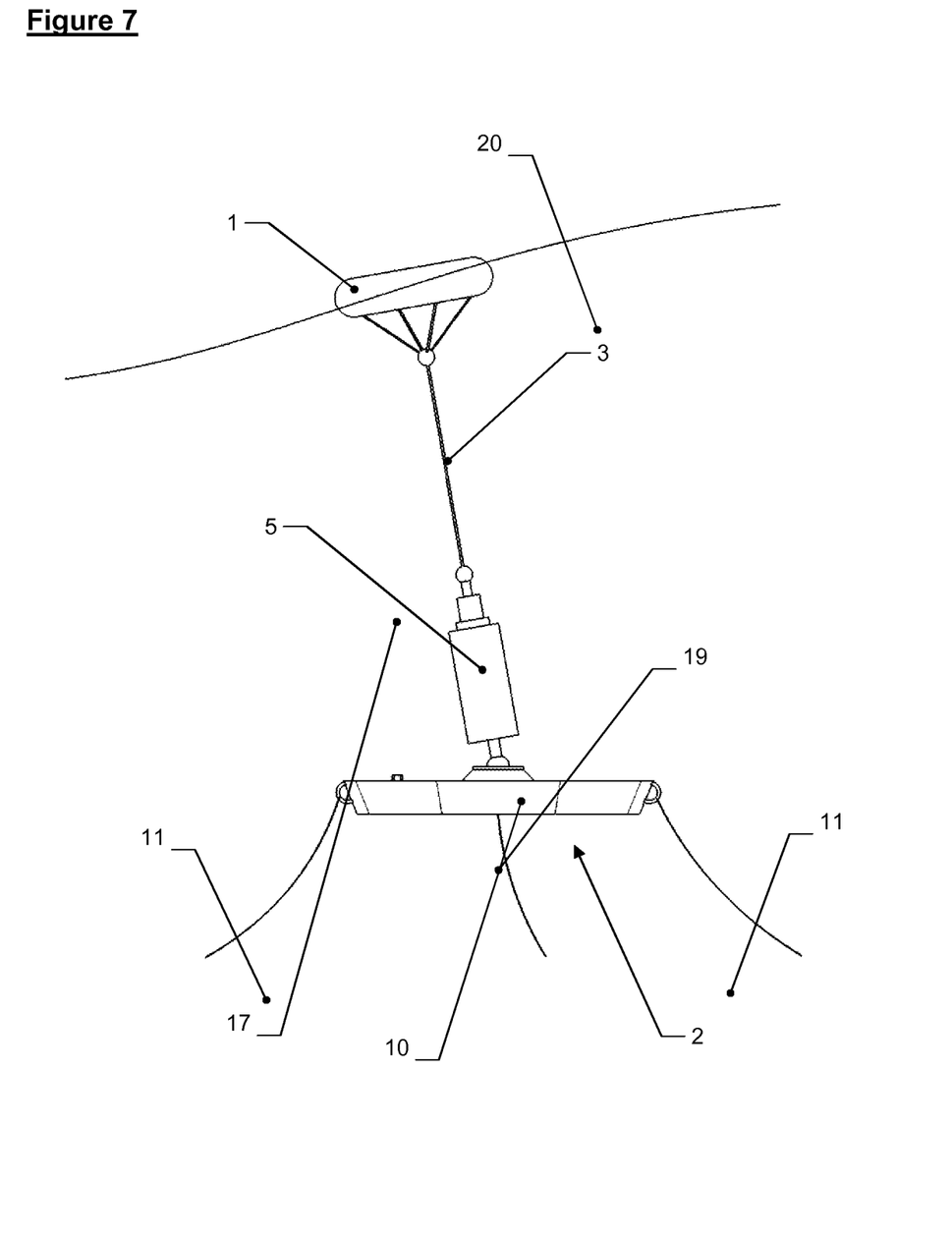
FIG. 7 is a perspective view of a third embodiment of the invention when in a first configuration.

With reference to FIG. 7, a third embodiment of the invention is shown. The third embodiment differs from the previous embodiments by way of the inclusion of a hinged joint 19 between the energy converter 5 and the reaction body 2. The hinged joint allows the energy converter 5 to align itself with the movement of the surface float as the slope of the waves 20 will tend to move the float 1 to and fro as well as up and down. The same effect could be achieved by including an extra piece of connecting line 3 between the energy converter 5 and the reaction body 2.

Other aspects of the third embodiment operate in a similar manner to those of the first and second embodiments.

Figure 8:
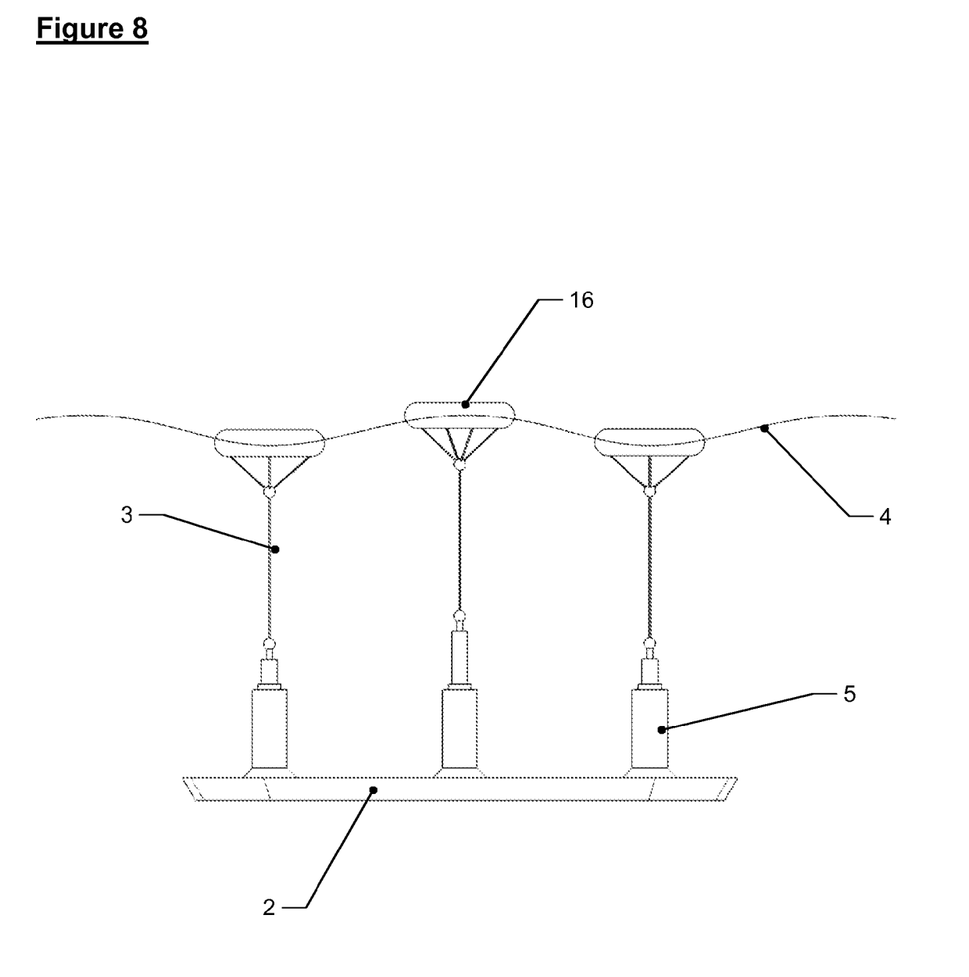
FIG. 8 is a perspective view of a fourth embodiment of the invention.

With reference to FIG. 8, a fourth embodiment of the invention is shown. The fourth embodiment comprises multiple floats 16, connecting lines 3 and energy converters 5 connected to a common reaction body 2. This layout allows a single device to have a larger power output, and improves the convenience of transportation and installation compared to a group of single devices of the same power output.

The fourth embodiment also allows for reduced cost because the number of device subsystems could be reduced compared to multiple devices of an equivalent output. For example, if a hydraulic energy conversion system were used, the output from the individual hydraulic pistons could be sent to a single hydraulic accumulator and generator. The number of mooring lines and power umbilicals could also be reduced.

Other aspects of the fourth embodiment operate in a similar manner to those of the previous embodiments.

Figure 9:
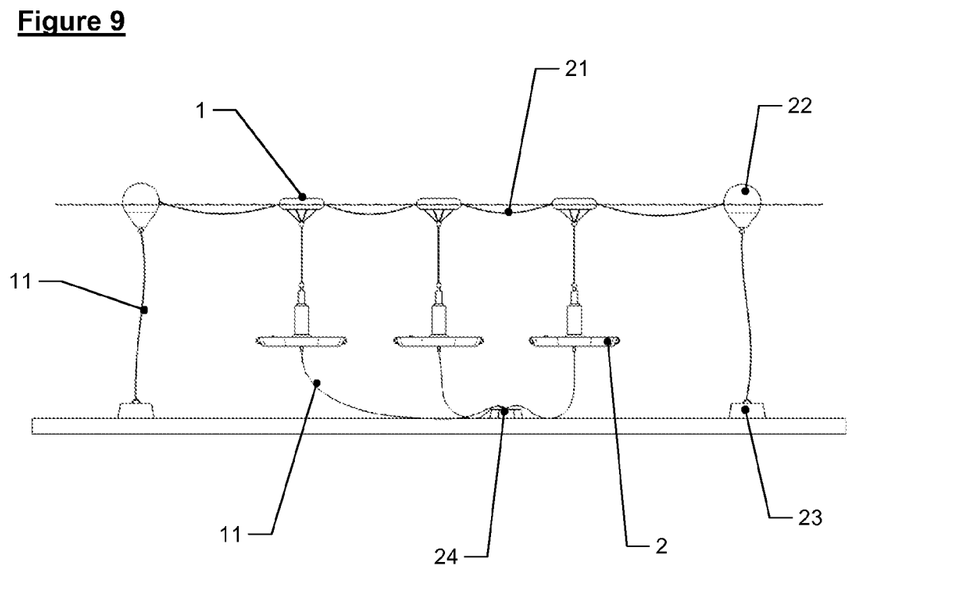
FIGS. 9 and 10 show arrays in which multiple devices according to the invention are connected to one another.
Figure 10:
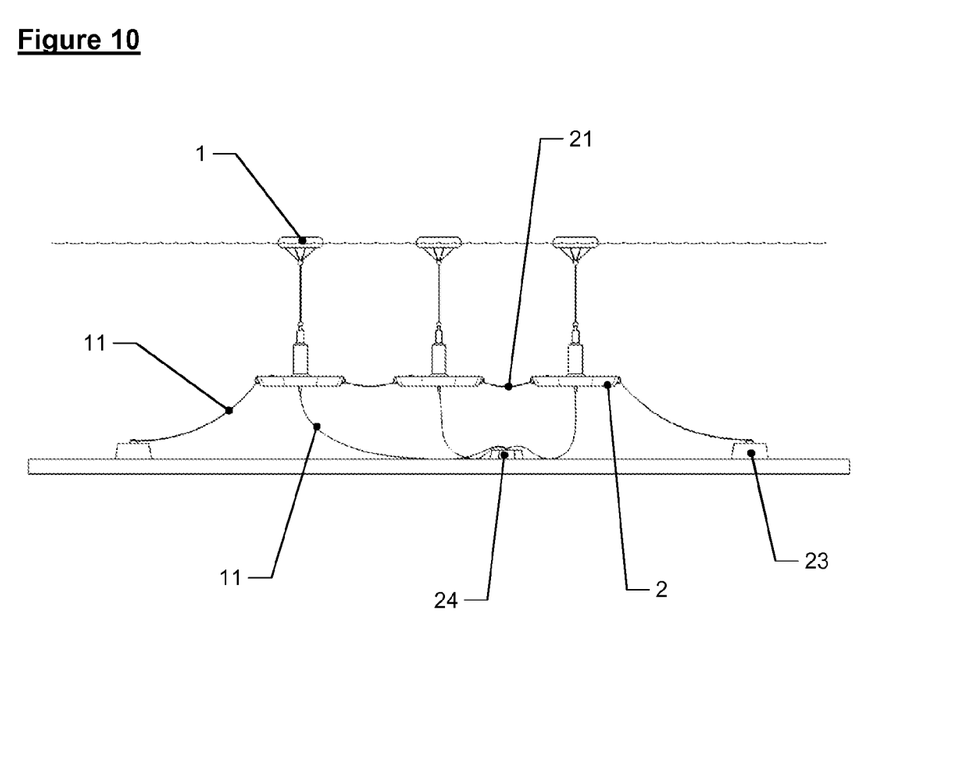

With reference to FIGS. 9 and 10, two possible arrangements for multiple installations of the device are shown. In order for wave energy converters to generate the large quantities of energy required to have an impact on global energy production, arrays of many hundreds, even thousands, of devices will be required.

Therefore it is important that any individual device is suitable for installation as part of such an array.

FIG. 9 shows an array in which multiple devices according to the invention are connected by a joining line 21 that links the surface floats 1 to each other. The number of devices can be increased over that shown and the array can extend in either one or two dimensions. The ends of the array are connected to positioning floats 22 which are in turn connected to anchoring weights 23.

The power umbilicals 10 from each device can be connected to a common underwater junction box 24 to minimise the amount of underwater cabling or piping required to transmit the power to a location where it can be used.

FIG. 10 shows an array in which multiple devices are connected by a joining line 21 that links the reaction bodies 2 of each device. The reaction bodies 2 at the ends of the array are connected directly to anchoring weights 23. As with array shown in FIG. 8, any number of devices can be linked and two dimensional array of any shape can be employed.

Referring to the system in general, there are a number of benefits to its design which make it particularly suitable for its intended use:

Having only the surface float 1 of the device on the surface during operation offers some significant advantages. The float 1 can be made of non-rigid inflatable material (e.g. of a material available under the trade mark "Hypalon") which helps reduce cost, and means that accidental collisions with surface vessels would be non-damaging events to both parties. Having only a float on the surface means that visual impact of device would be minimal also.

Suspending the reaction body 2 and energy converter 5 of the device from a connecting line 3 well below the sea surface has the result that all complex parts of the system can be well away from the forces that can potentially be generated by surface waves 4.

When subject to extreme conditions, the device can be self-protecting, because the maximum force that can be placed on the reaction body 2 is equivalent only to the total buoyancy of the surface float 1. A very large wave will simply submerge the float 1 and is incapable of placing any greater load on the reaction body 2. The total buoyancy of the surface float 1 can also be set so that it is equal to the spring force S at the maximum upward stroke, ensuring that the system cannot be jarred by very large waves.

A freak breaking wave crashing down on the float 1 could cause a temporary slackening of the connecting line 3 but a flexible line cannot transfer a compressive force. Therefore breaking waves are unable to place abnormal loads on the system. During normal conditions, the spring 6 keeps the connecting line 3 taut at all times.

The installation procedure for the device is very simple and would typically comprise the following steps: the device is towed from port to the deployment site; pre-installed mooring lines 11 and power connection 10 are then attached to the device; the air is the let out of the reaction body 2 and it sinks below and is suspended from the surface float 1; the generator would then be operational.

The service/removal procedure is equally simple: the service vessel ties up on the surface float 1; a compressed air supply is attached to the snorkel line 8 and the reaction body 2 is filled with air and brought to the surface; the service is carried out on site when possible and when finished the air is let out again as above; if an off site service is required then the mooring lines 11 and power cable 10 are disconnected and the device is towed to port.

Whilst the invention disclosed herein has been described with reference to exemplary embodiments, other embodiments can be envisaged that remain with the scope of the invention. For example, the spring and the energy converter could be transferred to the surface float with only the reaction body being suspended from the connecting line. Alternatively the spring and energy converter could be positioned in or near the middle of the connecting line.

The invention claimed is:

1. A generator for converting wave motion in a body of water to useful energy, the generator comprising:
    a reaction member having adjustable buoyancy to provide at least two buoyancy configurations, said reaction member being arranged for towing across the surface of said body of water and having an upper face which comprises a stable service deck;
    a float which is capable of movement relative to said reaction member in response to said wave motion;
    a docking arrangement for said float, configured to secure said float in a stowed position on said service deck,
    a flexible connecting line connecting said reaction member to said float, said reaction member having inertia and drag to resist up and down movement of said float caused by said wave motion;
    an energy convertor for converting said relative movement; and
    a spring for directionally biasing said reaction member relative to said float, wherein said reaction member has
    (a) a submerged operating configuration, in which said reaction member is suspended from said float by said flexible connecting line at a depth set by the length of said connecting line, and
    (b) a maximum buoyancy configuration in which said reaction member floats on the surface of said body of water and provides a stable towing arrangement for the generator.

2. A generator according to claim 1, wherein said reaction member has an interior space that is selectively chargeable with at least one of water and air to vary at least one of the buoyancy and inertia thereof.

3. A generator according to claim 1, wherein said reaction member is shaped to provide drag to movement along an axis substantially perpendicular to the surface of said body of water.

4. A generator according to claim 1, wherein said float is made from inflatable material.

5. A generator according to claim 1, which further comprises mooring lines to position said generator relative to a bed of said body of water.

6. A generator according to claim 1, wherein said float is arranged to define a working stroke of reciprocal movement relative to said reaction member.

7. A generator according to claim 1, wherein said reaction member is directionally biased relative to said float.

8. A generator according to claim 1, in which said spring is partially overcome by the suspended weight of said reaction member.

9. A generator according to claim 1, wherein said energy convertor is disposed within or upon said reaction member.

10. A generator according to claim 1, wherein said reaction member has a streamlined hull.

11. A generator according to claim 1, wherein said docking arrangement comprises a first connector on said float and a second connector on said service deck, said first and second connectors being configured to mate with one another and secure said float in said stowed position on said service deck when mated.

12. A generator according to claim 11, wherein the first connector and second connector are mateable connectors.

13. A generator for converting wave motion in a body of water to useful energy, the generator comprising:
 a reaction member having an upper face that comprises a stable service deck, the reaction member further having adjustable buoyancy to provide at least two buoyancy configurations, said buoyancy configurations comprising a first configuration being a power-generating subsurface operating configuration, and a second configuration being a floating surface configuration, not for generating power, in which said reaction member floats on the surface of said body of water;
 a float which is capable of movement relative to said reaction member in response to said wave motion when said reaction member is in the subsurface power-generating operating configuration;
 a docking arrangement for said float, configured to secure said float in a stowed position on said service deck;
 a flexible connecting line connecting said reaction member to said float, said reaction member having inertia and drag to resist movement of said float caused by said wave motion when said reaction member is in the subsurface power-generating operating configuration; and
 an energy convertor for converting said relative movement, wherein said subsurface reaction member
 (a) is suspended from said buoyancy float by said flexible connecting line at a depth set by the length of said connecting line when said reaction member is in its subsurface operating configuration,
 (b) is directionally biased relative to said float when said reaction member is in its subsurface operating configuration, and
 (c) provides a stable towing platform for the generator when said reaction member is in its floating surface configuration.

14. A generator according to claim 13, wherein said reaction member has an interior space that is selectively chargeable with at least one of water and air to vary at least one of the buoyancy and inertia thereof.

15. A generator according to claim 13, wherein said reaction member is shaped to provide drag to movement along an axis substantially perpendicular to the surface of said body of water.

16. A generator according to claim 13, wherein said float is made from inflatable material.

17. A generator according to claim 13, which further comprises mooring lines to position said generator relative to a bed of said body of water.

18. A generator according to claim 13, wherein said float is arranged to define a working stroke of reciprocal movement relative to said reaction member.

19. A generator according to claim 13, wherein said reaction member is directionally biased relative to said float.

20. A generator according to claim 13, which includes a spring for directionally biasing said reaction member relative to said float, said spring being partially overcome by the suspended weight of said reaction member.

21. A generator according to claim 13, wherein said energy convertor is disposed within or upon said reaction member.

22. A generator according to claim 13, wherein said reaction member has a streamlined hull.

23. A generator according to claim 13, wherein said docking arrangement comprises a first connector on said float and a second connector on said service deck, said first and second connectors being configured to mate with one another and secure said float in said stowed position on said service deck when connected.

24. A generator according to claim 23, wherein the first connector and second connector are mateable connectors.

* * * * *